(12) United States Patent
Fiumano

(10) Patent No.: US 11,718,282 B2
(45) Date of Patent: Aug. 8, 2023

(54) TRACTION ASSEMBLY, PARTICULARLY FOR TERRESTRIAL TRACTION MACHINES AND THE LIKE

(71) Applicant: Dana Motion Systems Italia S.R.L., Reggio Emilia (IT)

(72) Inventor: Antonio Francesco Fiumano, Reggio Emilia (IT)

(73) Assignee: Dana Motion Systems Italia S.R.L., Reggio Emilia (IT)

(*) Notice: Subject to any disclaimer, the term of this patent is extended or adjusted under 35 U.S.C. 154(b) by 391 days.

(21) Appl. No.: 16/897,005

(22) Filed: Jun. 9, 2020

(65) Prior Publication Data

US 2020/0391716 A1 Dec. 17, 2020

(30) Foreign Application Priority Data

Jun. 11, 2019 (EP) .................................. 19425041

(51) Int. Cl.
*B60T 13/04* (2006.01)
*B60T 13/74* (2006.01)
*B60K 1/00* (2006.01)
*B60T 1/00* (2006.01)
*B60T 1/06* (2006.01)
*B62D 55/00* (2006.01)
*F16D 55/38* (2006.01)

(Continued)

(52) U.S. Cl.
CPC .............. *B60T 13/743* (2013.01); *B60K 1/00* (2013.01); *B60T 1/005* (2013.01); *B60T 1/065* (2013.01); *B62D 55/00* (2013.01); *F16D 55/38* (2013.01); *F16D 65/186* (2013.01); *F16D 2121/22* (2013.01); *F16D 2127/04* (2013.01)

(58) Field of Classification Search
CPC .......... B60K 7/0007; B60K 2007/0061; B60K 17/046; B60B 27/0052; B60T 1/065; B60T 1/005; B60T 13/743; F16D 65/186; F16D 2055/0058; F16D 55/38; F16D 2121/22; F16D 2127/04
See application file for complete search history.

(56) References Cited

U.S. PATENT DOCUMENTS

| | | | |
|---|---|---|---|
| 4,095,681 A * | 6/1978 | David | F16D 55/36 187/373 |
| 5,186,288 A * | 2/1993 | Sommer | F16D 59/02 188/72.3 |

(Continued)

FOREIGN PATENT DOCUMENTS

| | | |
|---|---|---|
| EP | 1914154 A1 | 4/2008 |
| WO | 2019015715 A1 | 1/2019 |

OTHER PUBLICATIONS

European Patent Office, Extended European Search Report Issued in Application No. 19425941.1, dated Dec. 16, 2019, Germany, 7 pages.

*Primary Examiner* — Nicholas J Lane
(74) *Attorney, Agent, or Firm* — McCoy Russell LLP

(57) ABSTRACT

A traction assembly for terrestrial traction machines, which includes at least one gearmotor adapted to be associated with a track or wheel of the terrestrial traction machine, and a parking brake of an electromagnetic type which is associated with the gearmotor, and wherein the parking brake is of a multi-dry-disk type and is interposed between the driving component of the gearmotor and a speed limiter of the gearmotor.

19 Claims, 6 Drawing Sheets

(51) Int. Cl.
*F16D 65/18* (2006.01)
*F16D 121/22* (2012.01)
*F16D 127/04* (2012.01)

(56) References Cited

U.S. PATENT DOCUMENTS

| | | | |
|---|---|---|---|
| 11,235,661 B1* | 2/2022 | Bonny | F16H 57/082 |
| 2002/0074194 A1* | 6/2002 | Kimble | F16D 55/227 |
| | | | 188/161 |
| 2006/0260886 A1* | 11/2006 | Erlston | F16D 55/50 |
| | | | 188/71.5 |
| 2009/0078528 A1* | 3/2009 | Uzawa | E02F 9/02 |
| | | | 192/12 D |
| 2009/0312134 A1* | 12/2009 | Schoon | H02K 7/116 |
| | | | 475/154 |
| 2018/0252278 A1 | 9/2018 | Naitou et al. | |
| 2019/0176616 A1* | 6/2019 | Forrest | F16D 1/10 |
| 2020/0384856 A1* | 12/2020 | Wang | F16H 3/66 |

* cited by examiner

TRACTION ASSEMBLY, PARTICULARLY FOR TERRESTRIAL TRACTION MACHINES AND THE LIKE

CROSS REFERENCE TO RELATED APPLICATIONS

The present application claims priority to European Patent Application No. 19425041.1, entitled "TRACTION ASSEMBLY, PARTICULARLY FOR TERRESTRIAL TRACTION MACHINES AND THE LIKE", and filed on Jun. 11, 2019. The entire contents of the above-listed application is hereby incorporated by reference for all purposes.

BACKGROUND AND SUMMARY

The present invention relates to a traction assembly, particularly for terrestrial traction machines and the like.

In the sector of terrestrial traction of the electric type, the use is known of machines, tracked and non-tracked, which have independent drive wheels.

Such independence of traction is made possible by the use of independent electric motors, one for each drive wheel.

A traction architecture of this type necessarily brings with it the need to provide each drive wheel with its own local speed limiter instead of having a centralized speed limiter, as can be done with terrestrial vehicles such as the automobiles or the like.

The drive wheels of such machines, which incidentally can be of the type with tires in order to be capable of rolling directly on the ground, or tracked in order to be capable of rolling within a track, which then transmits the necessary thrust for advancement directly to the ground, are therefore characterized by complex mechanics which leaves little space for other service devices such as, for example, braking devices.

With particular reference to tracked machines, i.e. to specific works vehicles intended to operate on particularly uneven terrain, each single drive wheel internally contains a speed limiter of the planetary gear type, in which the ring gear directly defines the track wheel body and in which the driving shaft is directly associated with the electric motor coaxially with the input coupling of the planetary gear set.

The individual electric motors with which the machine is provided are therefore mounted on board the wheels, typically on the inner side of the individual track.

As mentioned previously, there is little space where service devices, such as specifically parking brakes, can be installed.

More specifically, on such works vehicles of the tracked type, two types of parking brake are known: single-disk electromagnetic brakes and multi-disk hydraulically-actuated brakes.

Single-disk parking brakes, in order to supply the braking torque required to safely hold a tracked works vehicle, require such a large diameter of the braking disk that its integrated installation in the wheel body becomes unfeasible, consequently requiring its installation upstream of the electric motor on the inner side of the track together with the electronic components necessary for its application/release.

Such solution, which as will be better described below is preferable to hydraulically-actuated brakes owing to a simplification of the systems in the machine, in that in an electrically-driven vehicle no oil under pressure is available, has the drawback of being excessively cumbersome in relation to the unevenness of the ground on which the machine operates, which may result in unwanted shocks and therefore in damages to the elements that are exposed outside the width of the tracks.

Multi-disk brakes on the other hand make it possible to reduce the diameter of the disks by dividing the braking torque over multiple disks that operate on each other.

With this architecture it is possible to integrate the brake directly in the wheel body by physically interposing it between the engine and the speed limiter.

However, even this solution is not devoid of drawbacks among which is the fact that, although it keeps down the radial encumbrances, the use of hydraulics complicates the design of the systems, among other things making it even more polluting than the previous solution owing to the capacity for deterioration of the oil used for actuation.

The aim of the present invention consists in providing a traction assembly, particularly for terrestrial traction machines and the like, which is of the electromagnetic type and which makes it possible to be integrated into the wheel body of the machine, thus avoiding encumbrances which protrude both from the inner side and from the outer side of the wheel body.

An object of the present invention is to provide a traction assembly that offers the widest guarantees of reliability and safety.

Another object of the present invention is to provide a traction assembly that is economically competitive when compared to the known art.

This aim and these and other objects which will become better apparent hereinafter are achieved by a traction assembly, particularly for terrestrial traction machines and the like, which comprises at least one gearmotor which is adapted to be associated with a track or wheel of a terrestrial traction machine or the like, and a parking brake of the electromagnetic type which is associated with said at least one gearmotor, characterized in that said parking brake of the electromagnetic type is of the multi-dry-disk type and is interposed between the driving component of said at least one gearmotor and the speed limiter of said at least one gearmotor.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Further characteristics and advantages of the invention will become better apparent from the detailed description of a preferred, but not exclusive, embodiment of a traction assembly, particularly for terrestrial traction machines and the like, according to the invention, which is illustrated by way of non-limiting example in the accompanying drawings, wherein:

FIG. 1 is shown approximately to scale. FIGS. 1-6 are shown with components in proportional size with one another, according to some embodiments.

DETAILED DESCRIPTION

Figure 3:
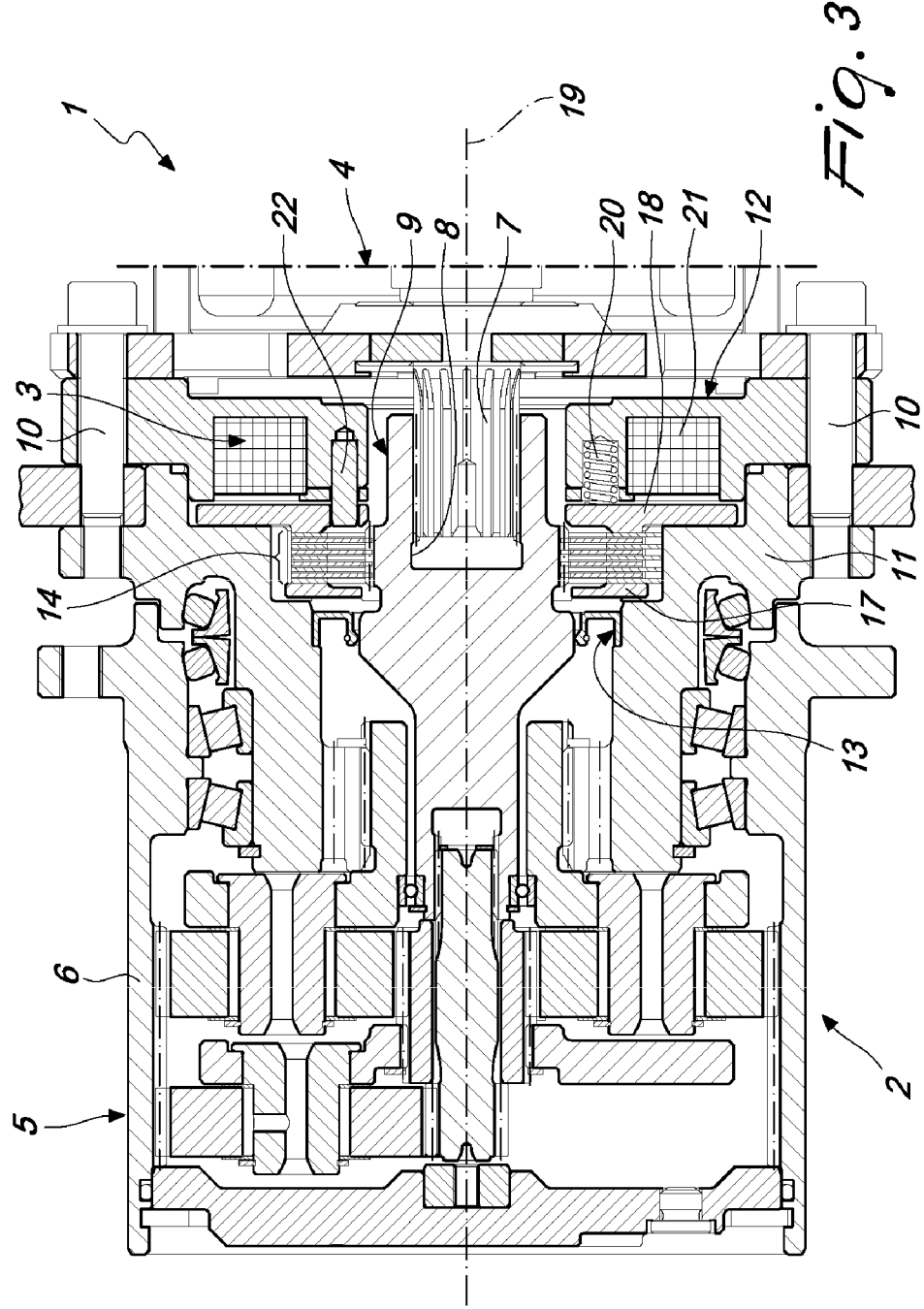
FIG. 3 is a cross-sectional view of the traction assembly according to the invention, taken along the line in FIG. 2.

With particular reference to the figures, the traction assembly, particularly for terrestrial traction machines and the like, generally designated in FIG. 3 with the reference numeral 1, comprises at least one gearmotor 2 which is intended to be associated with a track or wheel of a terrestrial traction machine or the like, and a parking brake 3 of the electromagnetic type which is associated with said at least one gearmotor 2.

In the embodiment proposed, the traction assembly 1 is preferably adapted to terrestrial traction machines or the like which consist of a tracked vehicle, and the gearmotor 2 comprises an electric motor 4 which is associated by bolting 10 and shape mating with a speed limiter 5 of the planetary gear type, per se known and therefore not described in detail, in which the outer ring gear 6 defines a drive wheel of the terrestrial traction machine or the like on which it is installed.

The wording "machines or the like" is intended to comprise any works vehicle that entails the use of a traction assembly fitted with a parking brake, such as for example a conventional lifting winch.

More specifically, the output shaft 7 of the electric motor 4 is provided with an outer grooving and is inserted coaxially into a respective grooved hole 8 which is defined at the head of the input coupling 9 of the speed limiter 5.

In this way, the input coupling 9 is driven by the output shaft 7 of the electric motor 4 and the latter is coupled axially to the speed limiter 5 by bolting 10.

Figure 1:
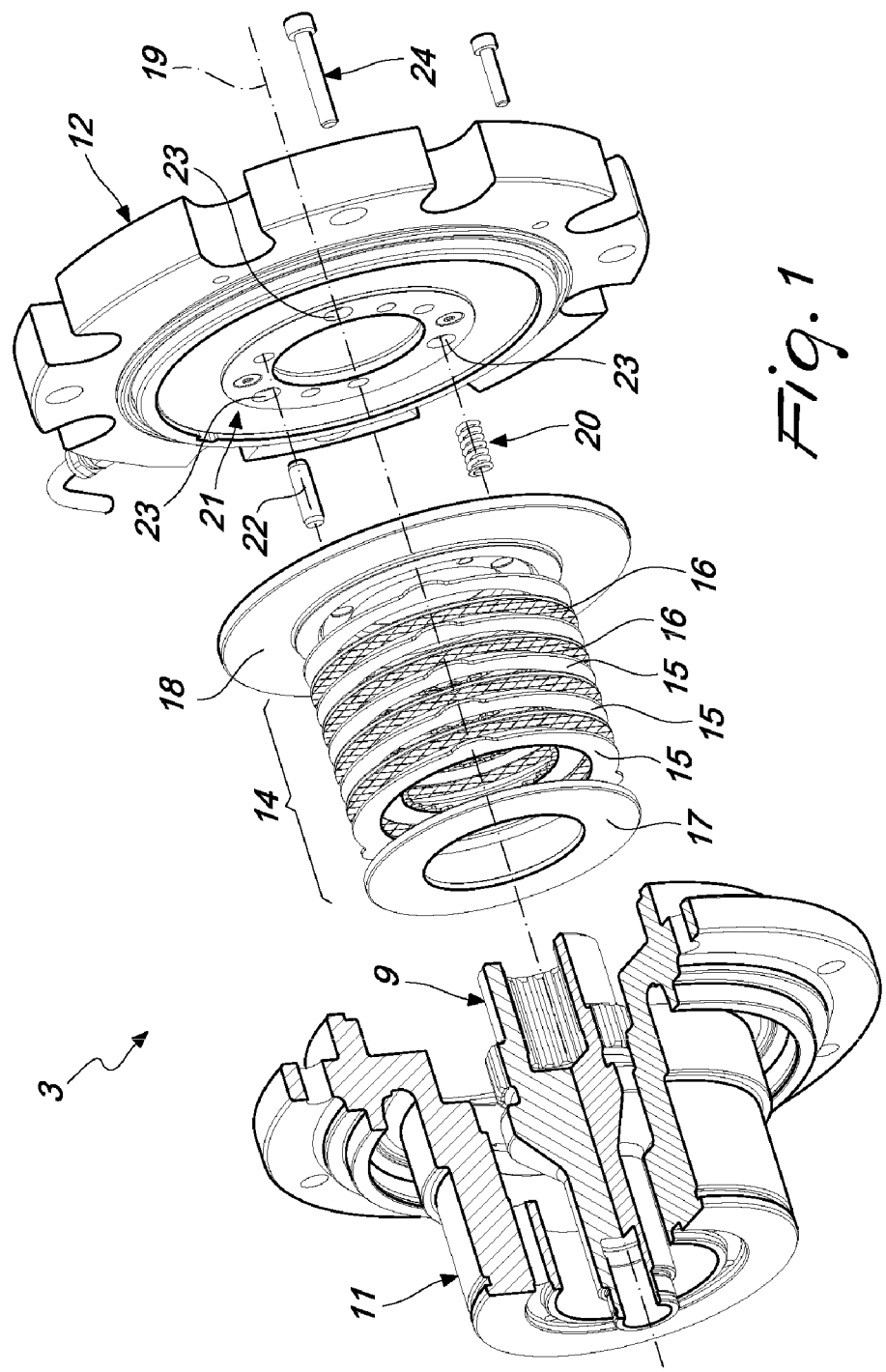
FIG. 1 is an exploded and partially cross-sectional perspective view of the parking brake of a traction assembly according to the present invention.
Figure 2:
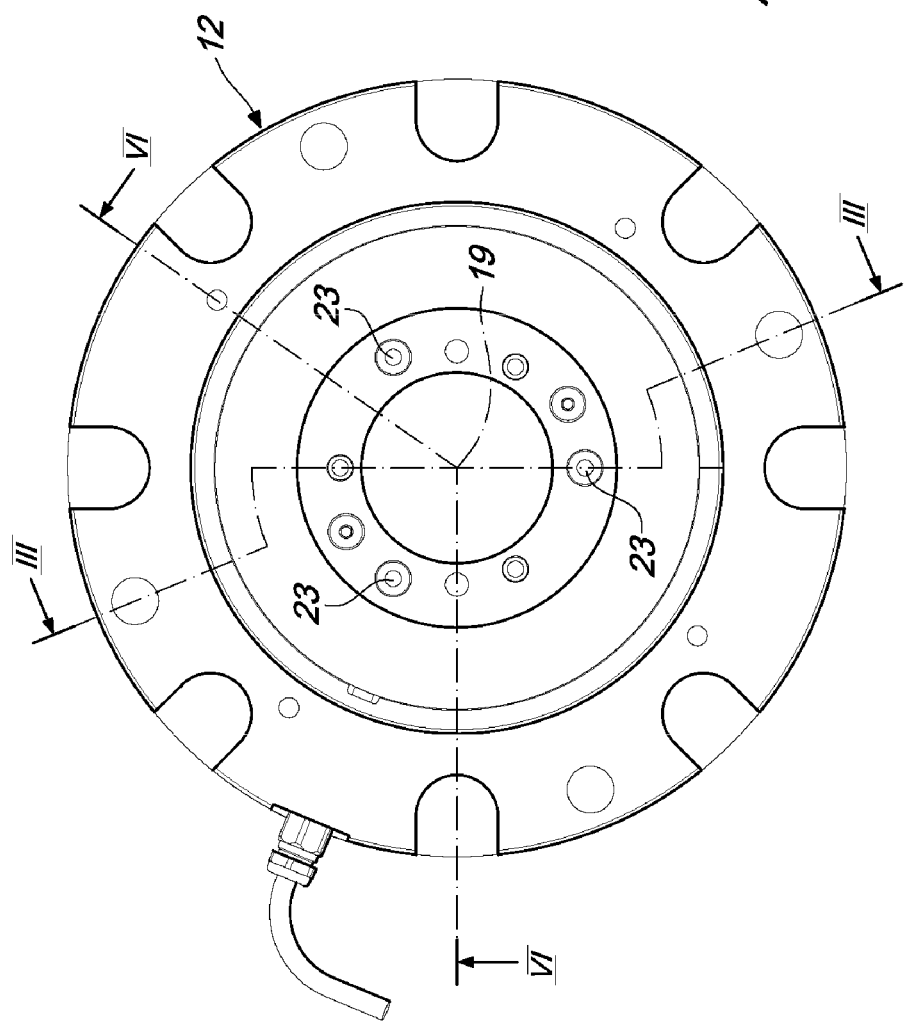
FIG. 2 is a front elevation view of a component of the parking brake shown in FIG. 1.

With particular reference to FIGS. 1 and 3, according to the invention, the parking brake 3 is of the multi-dry-disk type and is interposed between the driving component of the gearmotor 2, i.e. the electric motor 4, and the speed limiter 5 of the gearmotor 2.

In more detail, the parking brake 3 comprises an outer casing 11, which is associated with the input coupling 9 of the speed limiter 5 and is substantially bell-shaped, and a closure flange 12, which is associated with the outer casing 11 at its wider base and can be integrally associated with the supporting structure of the terrestrial traction machine or the like in such a way that it is stationary with respect to the rotation of the driving shaft 7.

Conveniently, the outer casing 11 and the closure flange 12 are coaxially fitted over the input coupling 9 via two mutually opposite central holes which are defined, respectively, on the outer casing 11 and on the closure flange 12, and they are associated with the input coupling 9 by way of watertight means 13, which consist for example of a gasket seal interposed between the inner surface of the outer casing 11 and the outer surface of the input coupling 9, in such a way as to define a watertight chamber for accommodating a pack of friction disks 14.

In this way, the moving parts of the speed limiter 5 can operate in an oil bath with the parking brake 3 operating dry, thus protecting the moving parts from any friction material that detaches from the pack of friction disks 14 as a result of its normal wear and, at the same time, allowing interventions on it with the simple removal of the electric motor 4 and of the closure flange 12 without necessarily having to extract the oil contained in the speed limiter 5.

More specifically, the friction disks of the pack 14 have a substantially annular shape structure so as to be fitted over the input coupling 9 and they comprise first disks and second disks 15 and 16 which are mutually alternated with each other and are integral in rotation, respectively, with the input coupling 9 and with the outer casing 11.

In the embodiment proposed, the first disks 15 are of the smooth type and are slideably associated, at their outer radial profile, with the outer casing 11 by way of male/female shape mating of the type with lobes and the second disks 16 are of the sintered type and are slideably associated, at their inner radial profile, with the input coupling 9 by way of male/female shape mating of the with grooved profiles.

Figure 4:
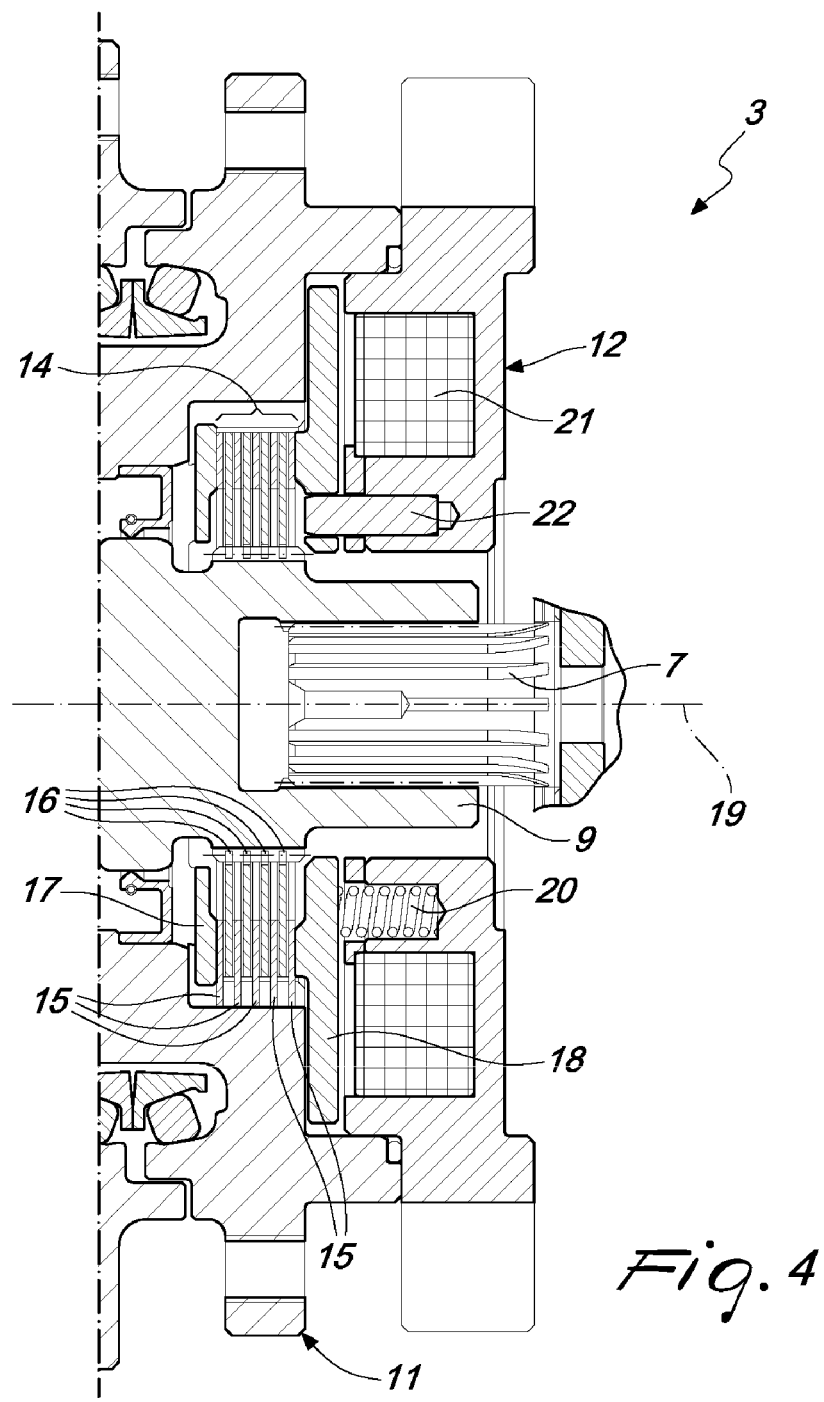
FIG. 4 is an enlarged-scale detail of the parking brake shown in FIG. 3 in its braking state.
Figure 5:
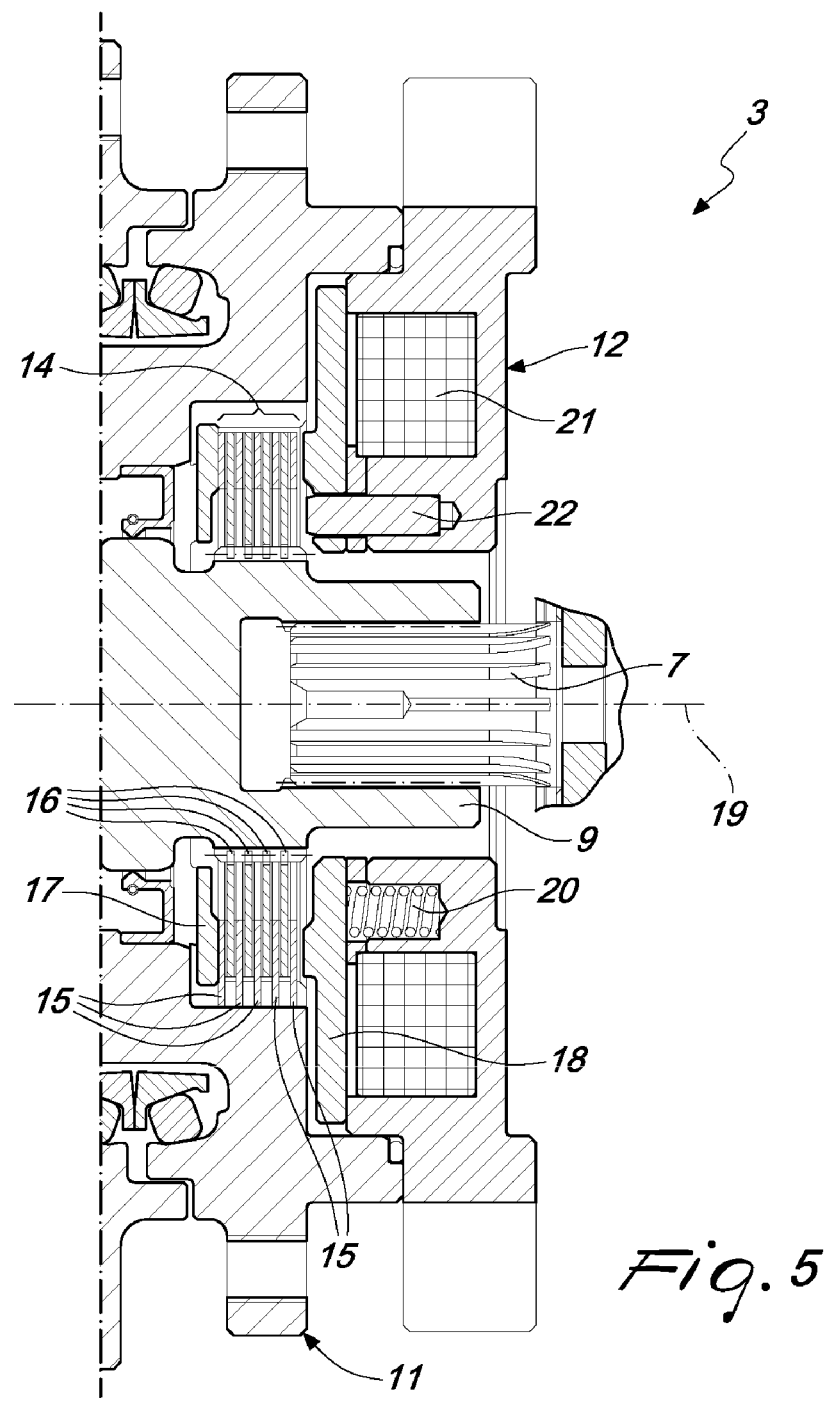
FIG. 5 is an enlarged-scale detail of the parking brake shown in FIG. 3 in its open state.

Conveniently, the friction disks 15 and 16 are interposed between a spacer 17, which is integral with the outer casing 11, and a moving anchor 18, which is integral with the closure flange 12, which in turn is connected to the outer casing 11, and which can move along a direction parallel to the rotation axis 19 of the driving shaft 7, owing to and in contrast with elastic means 20 which are interposed between the moving anchor 18 and the closure flange 12 as a result of the activation or deactivation of means for generating electromagnetic fields 21 which are associated with the closure flange 12, between a braking position, in which the means for generating electromagnetic fields 21 are deactivated and the moving anchor 18 is in contact with the friction disks 15 and 16 as a result of the thrust exerted by the elastic means 20 pushing against the spacer 17 as shown in FIG. 4, and a neutral position, in which the means for generating electromagnetic fields 21 are activated and the moving anchor 18 is spaced apart from the friction disks 15 and 16 as a result of the electromagnetic attraction generated by the means for generating electromagnetic fields 21 in contrast with the thrust exerted by the elastic means 20 as shown in FIG. 5.

In the embodiment proposed, the moving anchor 18 is slideably associated with the closure flange 12 by way of a plurality of pins 22 which protrude from the closure flange 12 in the direction of the outer casing 11 along a direction parallel to the rotation axis 19 and the elastic means 20 comprise a plurality of helical springs which are interposed between the moving anchor 18 and the closure flange 12 and are oriented in a direction which is substantially parallel to the rotation axis 19.

More specifically, the helical springs are at least partially accommodated in adapted seats 23 which are defined on the face of the closure flange 12 that faces the direction of the moving anchor 18.

The means for generating electromagnetic fields 21 comprise a toroidal solenoid which is associated with the closure flange 12 and has a central axis which coincides substantially with the rotation axis 19.

Advantageously, in order to allow the disengagement (release) of the parking brake 3 in the event of failure of the battery or batteries to power the toroidal solenoid, so making it possible to operate the vehicle and enable its movement, the traction assembly 1 comprises manual means for actuation 24 of the parking brake 3 which are adapted to release the moving anchor 18 from the braking position to the neutral position.

In more detail, such manual means for actuation 24 comprise at least one threaded screw associated with a threaded hole which is defined on the moving anchor 18 and passes through the closure flange 12, the threaded screw having a gripping head arranged on the opposite side with respect to the moving anchor 18 for its engagement with adapted manual tools so as to be screwed into the moving anchor 18 and attract the latter in the direction of the gripping head, thus moving the moving anchor 18 away from the friction disks 15 and 16, thus releasing them from the locked position, or so as to be unscrewed from the moving anchor 18 and so move the latter closer to the friction disks 15 and 16.

Operation of the traction assembly 1 can be easily understood from the foregoing description.

With particular reference to FIG. 4, in the braking status of the traction assembly 1, the means for generating electromagnetic fields 21 are deactivated and, by virtue of the elastic means 20, the moving anchor 18 is pressed against the friction disks 15 and 16 which, by virtue of mutual friction, are integral in rotation with each other and with the respective elements with which they are associated.

In this way, the speed limiter 5 is locked in rotation with respect to the closure flange 12, which in turn is coupled to the supporting structure of the terrestrial traction machine or the like.

With particular reference to FIG. 5, in the open status of normal operation of the traction assembly 1, the means for generating electromagnetic fields 21 are activated and the moving anchor 18 is detached from the friction disks 15 and 16, in contrast with the action of the elastic means 20, thus leaving them free to rotate with respect to each other and with the respective elements with which they are associated.

In this way, the speed limiter 5 is free to rotate with respect to the closure flange 12 and can be driven by the rotation of the electric motor 4.

Figure 6:
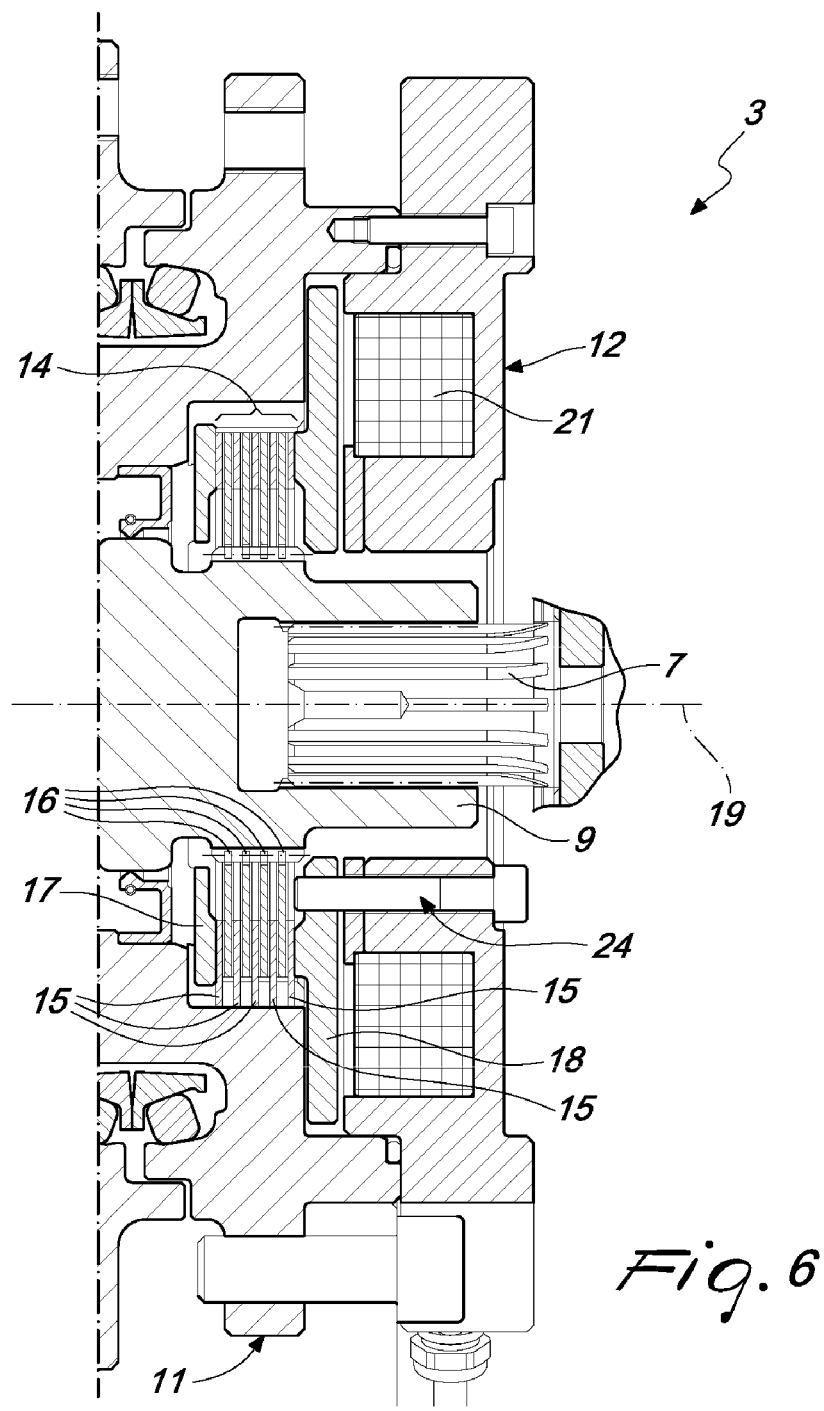
FIG. 6 is a cross-sectional view of the traction assembly according to the invention, taken along the line VI-VI in FIG. 2.

With particular reference to FIG. 6, regardless of the state of the traction assembly 1 and therefore of the activation or deactivation of the means for generating electromagnetic fields 21, by way of the activation of the manual means for actuation 24 it is possible to force-release the parking brake 3, locating the moving anchor 18 in its neutral position, as previously described.

In practice it has been found that the traction assembly, particularly for terrestrial traction machines and the like, according to the invention, solves the technical problem described above by making it possible to integrate inside it a parking brake of the electromagnetic type and with reduced axial and radial encumbrances with respect to the parking brakes belonging to the known art.

Another advantage of the traction assembly, according to the present invention, consists in that it has manual means for actuation which are adapted to release the wheel of the vehicle regardless of the state of the means for generating electromagnetic fields.

Moreover, the traction assembly according to the invention can have application in different types of works vehicles, apart from in traction machines, such as for example conventional lifting winches.

The traction assembly, particularly for terrestrial traction machines and the like, thus conceived, is susceptible of numerous modifications and variations, all of which are within the scope of the appended claims.

Moreover, all the details may be substituted by other, technically equivalent elements.

In practice, the materials used, as well as the contingent shapes and dimensions, may be any according to the requirements and to the state of the art.

The foregoing description is considered as illustrative only of the principles of the invention. Further, since numerous modifications and changes will readily occur to those skilled in the art, it is not desired to limit the invention to the exact construction and processes shown and described herein. Accordingly, all suitable modifications and equivalents may be considered as falling within the scope of the invention as defined by the claims, which follow below.

FIGS. 1-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A traction assembly for terrestrial traction machines, which comprises:
   at least one gearmotor and a track or wheel, and
   an electromagnetic and multi-dry-disk parking brake interposed between a driving component of said at least one gearmotor and a speed limiter of said at least one gearmotor, wherein said parking brake comprises:

a closure flange and an outer casing;

a pack of friction disks fitted over an input coupling of the speed limiter;

a moving anchor movable along a direction parallel to a rotation axis of a driving shaft between a braking position and a neutral position, in the braking position, said moving anchor pressed into contact with said pack of friction disks by elastic means positioned between the moving anchor and the closure flange, and in the neutral position, an electromagnet urges the moving anchor away from said pack of friction disks and opposes thrust exerted by said elastic means; and a screw and a threaded hole adapted to release said moving anchor from said braking position to said neutral position, the threaded hole positioned on the moving anchor and radially inside of a coil of the electromagnet, the screw passing through said closure flange; said screw having a head arranged on an opposite side of the closure flange of said moving anchor, the screw engaging with said moving anchor to attract the moving anchor in the direction of said head and away from said friction disks to release the friction disks from a locked position.

2. The traction assembly according to claim 1, wherein the outer casing is associated with the input coupling of said speed limiter and is substantially bell-shaped, and the closure flange is associated with said outer casing at its wider base and is capable of being integrally associated with supporting structure of said terrestrial traction machine in such a way that it is stationary with respect to the rotation of the driving shaft; said outer casing and said closure flange being coaxially fitted over said input coupling via two mutually opposite central holes which are defined, respectively, on said outer casing and on said closure flange; said outer casing and said closure flange being associated with said input coupling by way of watertight means in such a way as to define a watertight chamber for accommodating the pack of friction disks; the pack of friction disks comprising first disks and second disks which are mutually alternated with each other and are integral in rotation, respectively, with said input coupling and with said outer casing, said disks of said pack of friction disks being interposed between a spacer, which is integral with said outer casing, and the moving anchor, which is integral with said closure flange which in turn is connected to said outer casing, the moving anchor movable via the elastic means interposed between said moving anchor and said closure flange and activation or deactivation of the electromagnet associated with said closure flange, wherein in the braking position the electromagnet is deactivated.

3. The traction assembly according to claim 2, wherein said moving anchor is slideably associated with said closure flange by way of a plurality of pins which protrude from said closure flange in the direction of said outer casing along a direction parallel to said rotation axis.

4. The traction assembly according to claim 2, wherein said elastic means comprise a plurality of helical springs which are interposed between said moving anchor and said closure flange and are oriented in a direction which is substantially parallel to said rotation axis, said helical springs being at least partially accommodated in adapted seats which are defined on the face of said closure flange that faces the direction of said moving anchor.

5. The traction assembly according to claim 2, wherein said watertight means comprise a gasket interposed between the inner surface of said outer casing and the outer surface of said input coupling.

6. The traction assembly according to claim 2, wherein said means for generating electromagnetic fields comprise a toroidal solenoid which is associated with said closure flange and has a central axis which coincides substantially with said rotation axis.

7. The traction assembly according to claim 2, wherein said first disks are slideably associated with said outer casing by way of male/female shape mating, said male/female shape mating being of the type with lobes, and said first disks are of the smooth type.

8. The traction assembly according to claim 2, wherein said second disks are slideably associated with said input coupling by way of male/female shape mating, said male/female shape mating being of the type with grooved profiles, and said second disks are of the sintered type.

9. The traction assembly according to claim 1, wherein the head is engaged by manual tools to screw the screw into said moving anchor and release the friction disks from the locked position or unscrew the screw from said moving anchor and allow the elastic means to urge the moving anchor toward the friction disks.

10. The traction assembly according to claim 1, wherein said speed limiter is of a planetary gear type.

11. The traction assembly according to claim 10, wherein an outer ring gear of said speed limiter of the planetary gear type defines a drive wheel of said terrestrial traction machine.

12. The traction assembly according to claim 11, wherein said terrestrial traction machine is a tracked vehicle.

13. A traction assembly comprising:

a gearmotor having an input shaft rotatable about an axis of rotation of a track or wheel of a terrestrial traction machine;

a parking brake with an outer casing that extends along the axis of rotation into a drive wheel of the track or wheel and a closure flange attached to one another and adapted to attach to a non-rotating structure of the terrestrial traction machine;

an input coupling rotatable along the axis of rotation and configured to receive the input shaft of the gearmotor, the input coupling extending along the axis of rotation into the outer casing that extends into the drive wheel, and the input coupling rotatably connectable via one or more gears to drive the drive wheel;

a pack of friction disks sized and shaped so as to fit over the input coupling; and a moving anchor slideably movable along the axis of rotation between the pack of friction disks and the closure flange, the moving anchor slideably movable by an electromagnet and elastic means so as to selectably move the moving anchor into contact with the pack of friction disks to lock the friction disks to prevent relative rotation between the input coupling and the outer casing; and a screw and a threaded hole of the moving anchor, the screw comprising a head arranged on an opposite side of the closure flange from the moving anchor and the screw arranged radially inside of a coil of the electromagnet, and the moving anchor moved away from contact with the friction disks when the screw is in an engaged position.

14. The traction assembly of claim 13, wherein the pack of friction disks comprises a multi-dry-disk type.

15. The traction assembly of claim 13, further comprising planetary gears arranged within the drive wheel and rotatably connecting the input coupling to the drive wheel.

16. The traction assembly of claim 14, wherein the multi-dry-disk type comprises pairs of friction disks, each pair comprising a smooth type and a sintered type.

17. The traction assembly of claim 16, wherein the movable anchor, when moved axially toward the closure flange, permits rotation of the friction disks relative to the outer casing, and when moved axially away from the closure flange, prevents rotation of the friction disks relative to the outer casing so as to prevent relative rotation between the input coupling and the outer casing.

18. The traction assembly of claim 13, wherein the closure flange comprises a toroidal solenoid adapted to permit selectably attracting the moving anchor toward the closure flange so as to cause the friction disks to become unlocked when the toroidal solenoid is energized so as to generate an electromagnetic field.

19. The traction assembly of claim 13, wherein the moving anchor is free to contact with the friction disks when the screw is in a disengaged position.

* * * * *